March 7, 1939.  W. N. HADLEY  2,149,886
THREAD CLIPPING MACHINE
Filed March 26, 1936  2 Sheets-Sheet 1
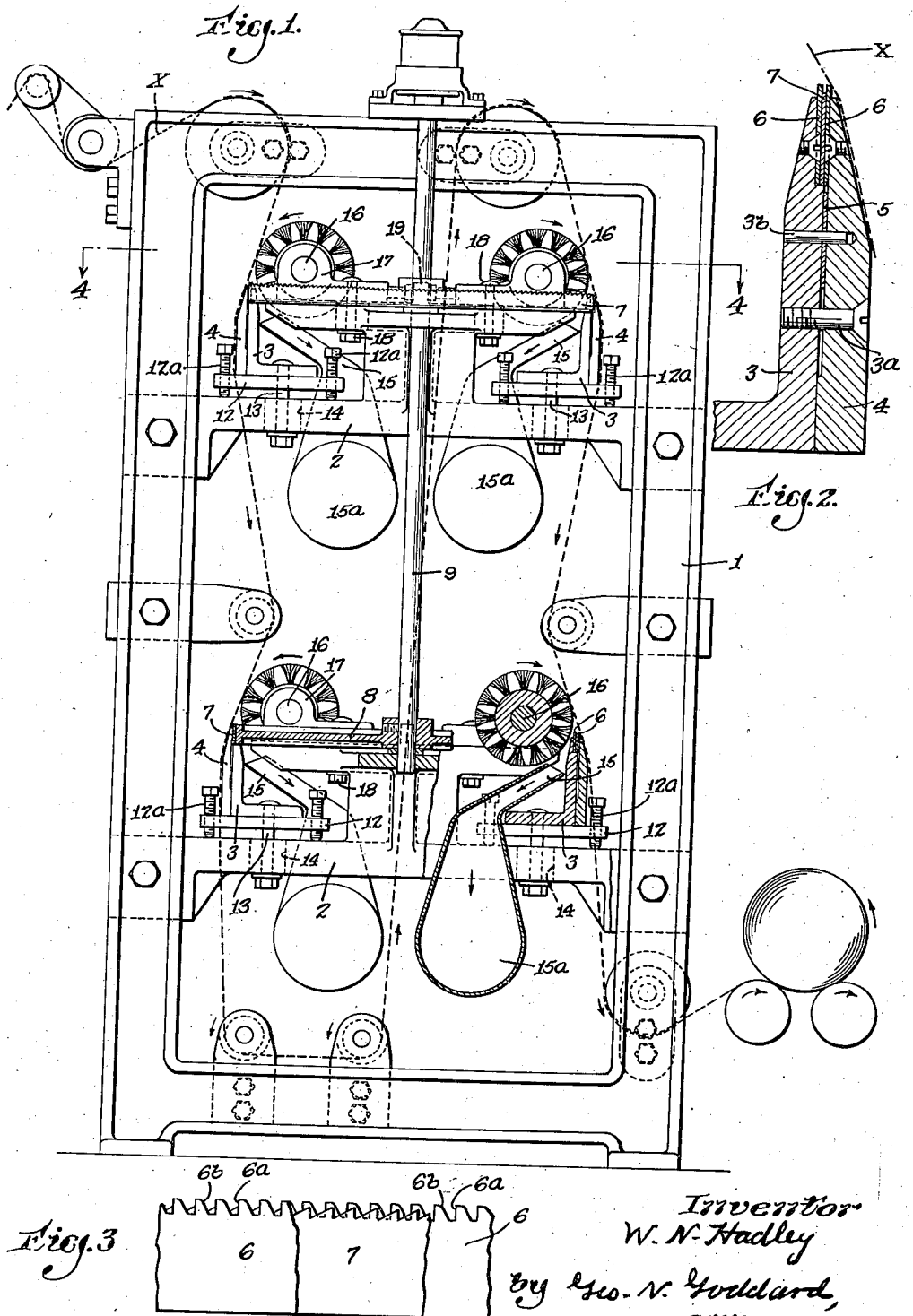
Inventor
W. N. Hadley
By Geo. N. Goddard,
Attorney March 7, 1939.   W. N. HADLEY   2,149,886
THREAD CLIPPING MACHINE
Filed March 26, 1936   2 Sheets-Sheet 2

Inventor
W. N. Hadley
by Geo. N. Goddard,
Attorney

Patented Mar. 7, 1939

2,149,886

UNITED STATES PATENT OFFICE 2,149,886

THREAD CLIPPING MACHINE

Wilfred N. Hadley, Springfield, Vt.

Application March 26, 1936, Serial No. 70,938

8 Claims. (Cl. 26—15)

This invention relates to the art of cloth finishing and is specially intended to provide a simple and efficient machine of large productive capacity for clipping or shearing off the threads or knots from the face of cloth in the piece and which, when acting upon a series of pieces of cloth sewed together end to end according to the well known practice in cloth shearing or cropping machines, is capable of continuous operation without interrupting of the shearing or clipping to allow the seams to pass the shearing lines undamaged.

With these and other objects in view, the invention comprises, generally speaking, the combination of a cutter blade whose travel or movement, when in operation, is in a plane transverse to the travel of the cloth and in approximate parallelism with the plane of the cloth at the shearing line, with associated guiding means coacting with the moving cutter to insure severance of the threads, loops or knots on the face of the fabric.

The principle of the invention may be embodied in several ways and in the accompanying drawings I have illustrated constructions for employing, respectively, a continuous travelling cutter in the form of an endless band and also a vibrating or reciprocatory type of cutter which also moves across the width of the fabric close to the face of the cloth. The construction is adapted to clip or dethread both faces of the cloth, if desired, and the construction is such that the stretch of cloth approaching the shearing line may lie in any desired plane.

In the drawings I have illustrated embodiments of the invention in which the cloth approaches the shearing line in nearly vertical planes, thereby greatly economizing in floor space, thus permitting repeated face shearing or clipping of the cloth as it passes through the machine.

In the accompanying drawings

Fig. 1 shows a right hand end elevation, partly in section, of a machine provided with four shearing lines at different levels, the cloth being guided through the machine to expose each face to repeated shearing action.

Fig. 2 is a cross sectional detail showing the construction by which the travelling cutter blade is supported and guided to move transversely of the travelling cloth.

Fig. 3 is a detail view showing the inner and outer notched guide members in their guiding and coacting relation to the travelling cutter.

Figure 4:
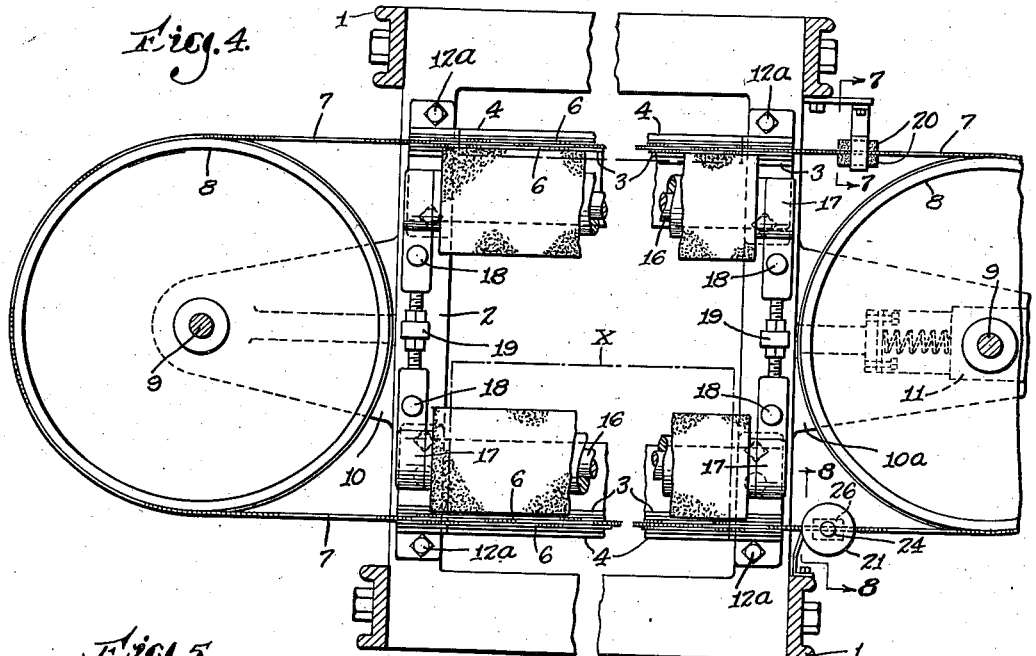
Fig. 4 is a sectional plan, on sectional line 4—4 of Fig. 1.

In the practice of the invention according to the particular form illustrated in the drawings, I provide suitable end frames 1 connected by crossbeams 2 which form supports for the cutters and coacting guides and the rotary raising brushes.

In the form shown in Figs. 1 to 4, inclusive, the cutter is in the form of a saw-toothed band 7, which is supported between inner and outer lateral guide plates 6 notched to form teeth having one edge extending transversely of the blade in the direction of the travel of the cloth, as shown at 6$^a$, while the other edge 6$^b$ of the tooth is inclined to form a guiding edge to guide approaching threads on the face of the cloth into the path of the travelling cutter teeth.

These notched knife guiding plates 6 are securely fastened by flush head screws to coacting supporting members 3 and 4, which are secured in face to face relationship by means of clamping screws 3$^a$ and are held in slightly spaced relation by means of shim plates 5 of any desired thickness according to the thickness of the guides or of the cutter blade. As shown in Fig. 2, dowel pins 3$^b$ pass through the shim plates 5 and serve in conjunction with the clamping screws 3$^a$ to maintain proper alignment between the transverse supporting members 3 and 4 which extend across the width of the machine frame.

As the endless band must travel in an orbital path around the supporting pulleys 8, the supporting members 3 and 4, which carry the cutter guides, are mounted on transverse beams 12 whose opposite end corners are provided with adjusting screws 12$^a$ for the purpose of permitting the tilting of the support to the proper angle for adjustment of the slot between the guides 6 into exact parallelism with the plane of the tangential stretches of the saw-toothed band cutter 7. A clamping bolt 13 passes through the angle foot of supporting beam 3 and through an opening in the end portion of the carrier beam 12 and through a slot 14 in the end truss 2, so that when the guide supports are correctly positioned to allow the tangential stretches of the cutter to run freely between them, the support may be firmly clamped against displacement in that position of adjustment.

The band cutter itself passes around the rims of supporting wheels 8, whose shafts, in this case vertically arranged, are mounted in projecting bearing brackets 10 provided with suitable shaft bearings for permitting the rapid rotation of the cutter supporting wheels. One of these shafts constitutes the driving shaft and the other is mounted in a spring-tensioned bearing box 11 for the purpose of keeping the cutter blade taut.

Figures 7, 8:
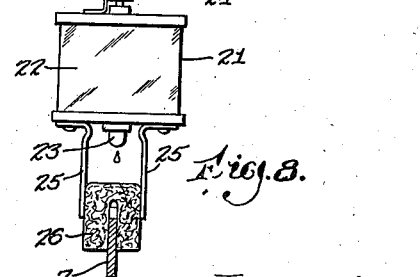
Fig. 7 is a detail view showing the sharpening stones between which the cutter travels.
Fig. 8 is a detail view showing the oil reservoir and swab for keeping the cutter blade lubricated.

At a convenient point there is provided a pair of sharpening stones 20 between which the tangential stretch of the cutter travels, as shown in Fig. 1. There is also provided a lubricating device 21, shown in detail in Fig. 8, and comprising an oil reservoir or container 22 having at its bottom a drip nozzle 23 controlled by an adjusting or regulating screw 24 and provided with clips 25 for holding the oil swab 26, which contacts with both faces of the cutter blade 7.

For the purpose of laying the face threads in a longitudinal inclined position there is provided a series of rotary brushes 16 in advance of each shearing line and arranged to have surface contact with the exposed face of the stretch of cloth being guided to the shearing line. These brushes travel at substantially higher speeds than the travel of the cloth through the machine in order to give the desired laying effect and their lines of contact with the cloth are preferably close to the corresponding shearing line. The bearings for these brushes are in the form of adjustable blocks 17 slidable along the end beams 2 of the frame and clamped in adjusted position by clamping bolts 18. The adjustment toward and away from the cloth may be effected by turnbuckles 19 engaging aligned threaded shanks projecting from the opposed ends of the bearing blocks 17.

The course of the cloth through the machine is indicated by dotted line X with its accompanying arrows and it will be noted that after the cloth has passed by the forward upper and lower shearing lines it travels in the reverse direction to the top of the machine and then down to the rearward of the upper and lower rear shearing lines, thus exposing the opposite face of the cloth to the clipping action at these points so that both faces of the cloth are trimmed twice in one passage through the machine.

The cutter blades, it will be observed, have the points of their teeth located a slight distance inside of the projecting tips of the teeth on the guide plates 6 so that the guides act to guard as well as guide the cloth and prevent any cutting of the body of the cloth by the travelling cutter teeth. This action is best illustrated in detail view, Fig. 2. The tips of the cutter guides 6, as shown, are blunt so as not to penetrate the cloth yet they are quite thin and act, as the cloth skims by, to raise the threads and support them against the cutting edges of the cutter blade. The shearing position of the cutter is determined primarily by the level of the wheels which form the direct support for the travelling cutters. The guides may be adjusted to project more or less beyond the points of the cutter blade by means of the adjusting screws 12ª, it being desirable that the toothed guides shall project slightly farther beyond the line of travel of the cutter teeth in the case of clipping thin or light weight cloth than when clipping heavier or thicker cloth.

In order to carry away the threads clipped from the face of the cloth, as well as to draw the travelling threads into contact with the cutter, there is provided for each shearing element an air exhaust nozzle 15 leading to offtake exhaust pipes 15ª. These nozzles extend the full width of the brushes adjacent to which they are located in the particular arrangement illustrated in the drawings.

Figure 5:
Fig. 5 is a detail view illustrating in end elevation, and partly in section, the assemblage of a reciprocatory cutter in relation to the flock brush and the exhaust.
Figure 6:
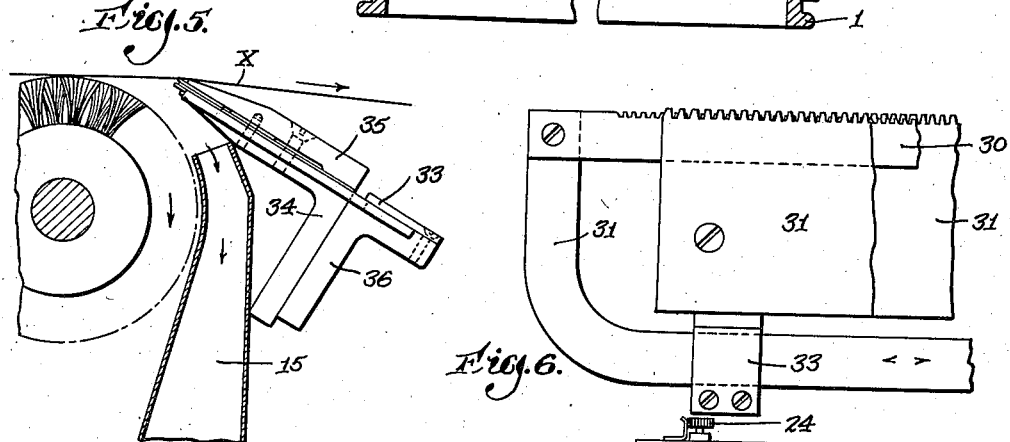
Fig. 6 is a detail view showing in plan the construction for supporting and guiding the reciprocating cutter of Fig. 5.

As shown in Fig. 5 and Fig. 6, a reciprocating cutter may be employed in which case the toothed blade 30 travels between notched or toothed guides 31, 31 spaced to receive the blade 30 and the opposite ends of the blade are secured to a rigid reciprocatory frame 32, which travels under guide plates 33 under the action of suitable reciprocating means of any desired type not here in shown. In this case, the teeth of the blade 30 have both edges equally inclined to the perpendicular and both edges of the teeth on the guides 31 are symmetrically inclined so that the teeth will have the same shearing action when moving either to the right or to the left. As in the preferred form of construction, the toothed or notched guide plates 31 are secured to firm cross beams 34, 35 and in the same manner. These supports for the guide plates are carried by a transverse beam 36 of angular form.

While the drawings show both the cutter blade and the associated guides serrated or notched, it will be understood that the use of a straight edge cutter blade is entirely within the scope of this invention.

What I claim is:

1. In a machine of the class described, the combination of an endless cutter band, supporting and driving pulleys arranged outside the opposite edges of the travelling cloth to cause the cutter band to travel across the face of the cloth in forward and rear tangential stretches, cutter guiding means extending across the width of the cloth in parallel guiding relation to the tangential stretches of the band and on opposite sides of the band, the forward edge portions of said guiding means being notched rearwardly to afford protection against injury to the cloth while exposing projecting threads to the shearing action of the travelling cutter.

2. In a machine of the class described, the combination of an endless band cutter mounted to travel across the face of the cloth in forward and rear transverse stretches to continuously shear the face of the cloth along two different shearing lines, forward and rear band guiding means arranged, respectively, in parallel guiding relation to said transversely moving stretches of the cutter band, the forward edge of each guiding means projecting beyond the cutting edge of the band to protect the advancing cloth from being cut and being also notched to expose projecting threads to the shearing action of the cutter.

3. In a machine of the class described, the combination of a cutter blade movable over the cloth in a direction transversely to the travel of the cloth, means for guiding the cutter blade in a straight line movement, means for guiding the cloth in appropriate shearing relation to the cutter, a rotary brush contacting the face of the cloth in close proximity to the shearing line for brushing forwardly toward the shearing line the threads on the face of the cloth approaching the cutter, and exhaust means arranged to create a suction at the shearing line for maintaining the advancing cloth in contact with the guiding means while drawing the threads raised by the brush directly into the shearing line and removing the severed ends of the threads.

4. In a cloth shearing machine, the combination with a main supporting frame, parallel vertical shafts arranged at opposite ends of the frame, upper and lower pulleys secured to said shafts, upper and lower flexible endless band cutters mounted on the upper and lower pairs of pulleys, respectively, to travel in tangential stretches, means for guiding each tangential stretch of said cutter bands, and means for guiding and presenting opposite faces of the cloth to different tangential stretches of the band cutter.

5. A guiding means for a shearing machine of the class described embracing in its construction opposed rigid supporting members, means for holding them in desired spaced relation, a pair of opposed thin guide plates secured interiorly of said holding members in opposed spaced relation, thereby providing a narrow deep channel for straight line travel of a shearing endless band blade, the outer edges of said guide plates being notched to receive advancing threads projecting from an adjacent web of cloth while exposing them to the shearing action of an interposed shearing blade.

6. In a machine for clipping face threads on a travelling web of cloth, the combination of an endless band cutter mounted upon and driven by spaced driving pulleys to travel continuously in one direction transversely of the cloth, a pair of spaced parallel correspondingly notched ledger blades embracing the travelling cutter band and projecting beyond the cutting edge of said band to guide and support upraised surface threads against the drawing action of the cutter blade to assist in severing the threads, means closely adjacent the cutting edge of said band for brushing the surface threads forwardly in the direction of travel of the cloth into the cutting zone, and means for sucking the loose end of the threads advancing to the cutter edge upward across the shearing line of the cutter band.

7. In a cloth shearing machine the combination of a pair of spaced parallel shafts, pulleys mounted one on each shaft, a flexible endless band cutter mounted on said pulleys, and means for guiding the cloth to the tangential stretches of the cutter so that one face of the cloth is presented to one tangential stretch and the other face of the cloth is presented to the other tangential stretch.

8. In a cloth shearing machine the combination of a pair of spaced parallel shafts, pulleys mounted one on each shaft, a flexible endless band cutter mounted on said pulleys to form two tangential stretches, means for guiding the cloth to one of the tangential stretches of the cutter to clip threads from one face of the cloth, means for carrying the cloth in a reverse direction between the stretches and means for thereafter carrying the cloth to the other tangential stretch to clip the threads on the other face of the cloth.

WILFRED N. HADLEY.